(12) United States Patent
Kang et al.

(10) Patent No.: US 11,488,384 B2
(45) Date of Patent: Nov. 1, 2022

(54) METHOD AND DEVICE FOR RECOGNIZING PRODUCT

(71) Applicant: BAIDU USA LLC, Sunnyvale, CA (US)

(72) Inventors: Le Kang, Beijing (CN); Yingze Bao, Beijing (CN)

(73) Assignee: BAIDU USA LLC, Sunnyvale, CA (US)

(*) Notice: Subject to any disclaimer, the term of this patent is extended or adjusted under 35 U.S.C. 154(b) by 288 days.

(21) Appl. No.: 17/029,978

(22) Filed: Sep. 23, 2020

(65) Prior Publication Data
US 2021/0097292 A1 Apr. 1, 2021

(30) Foreign Application Priority Data
Sep. 30, 2019 (CN) .......................... 201910945542.9

(51) Int. Cl.
G06V 20/40 (2022.01)
G06Q 30/06 (2012.01)
G06V 10/75 (2022.01)

(52) U.S. Cl.
CPC ......... *G06V 20/46* (2022.01); *G06Q 30/0633* (2013.01); *G06V 10/757* (2022.01)

(58) Field of Classification Search
CPC ........ G06V 20/46; G06V 20/52; G06V 20/48; G06V 20/60; G06V 10/84; G06V 10/757; G06V 20/41; G06Q 30/0633
See application file for complete search history.

(56) References Cited

U.S. PATENT DOCUMENTS 10,127,438 B1 * 11/2018 Fisher .................. G06Q 10/087
10,203,211 B1 * 2/2019 Mishra ............... G01C 21/3415
10,943,128 B2 * 3/2021 Zucker ................. G06K 7/1417
(Continued)

FOREIGN PATENT DOCUMENTS

CN        104732412 A  *  6/2015
CN        110264177 A  *  9/2019
(Continued)

OTHER PUBLICATIONS

Detecting Sweethearting in Retail Surveillance Videos—2009 (Year: 2009).*

(Continued)

*Primary Examiner* — Nizar N Sivji
(74) *Attorney, Agent, or Firm* — Fay Sharpe LLP

(57) ABSTRACT

The present disclosure provides a method and a device for recognizing a product, an electronic device and a non-transitory computer readable storage medium, relating to a field of unmanned retail product recognition. The method includes the following. A video taken by each camera in a store is acquired. A recognition is performed on each video to obtain a video segment that a product delivery is recognized and to obtain participated users. The participated users include a delivery initiation user and a delivery reception user. The video segment is inputted into a preset delivery recognition model to obtain a recognition result. The recognition result includes a product delivered and a delivery probability. The product information of products carried by the participated users is updated based on the recognition result.

14 Claims, 3 Drawing Sheets

(56) References Cited

U.S. PATENT DOCUMENTS

| | | | |
|---|---|---|---|
| 2013/0250115 A1* | 9/2013 | Fan | G07G 1/0036 |
| | | | 348/150 |
| 2014/0267407 A1* | 9/2014 | Mullins | G06T 15/20 |
| | | | 345/633 |
| 2015/0010204 A1* | 1/2015 | Iwai | G06V 20/52 |
| | | | 382/103 |
| 2015/0063640 A1* | 3/2015 | Anabuki | G06V 20/52 |
| | | | 382/103 |
| 2016/0034766 A1* | 2/2016 | Bobbitt | H04N 7/181 |
| | | | 348/150 |
| 2017/0323376 A1* | 11/2017 | Glaser | G06Q 20/203 |
| 2020/0387865 A1* | 12/2020 | Francis | G06F 16/2379 |
| 2021/0065106 A1* | 3/2021 | Thompson | G06F 16/9035 |

FOREIGN PATENT DOCUMENTS

| | | | | |
|---|---|---|---|---|
| CN | 112529604 A | * | 3/2021 | |
| WO | WO-2020156108 A1 | * | 8/2020 | G06F 17/15 |

OTHER PUBLICATIONS

Cart Auditor: A Compliance and Training Tool for Cashiers at Checkout—2010 (Year: 2010).*

How Computer Vision Provides Physical Retail with a Better View on Customers—2019 (Year: 2019).*

A deep learning pipeline for product recognition on store shelves—2019 (Year: 2019).*

* cited by examiner

METHOD AND DEVICE FOR RECOGNIZING PRODUCT

CROSS REFERENCE TO RELATED APPLICATIONS

This application claims priority and benefits to Chinese Application No. 201910945542.9, filed on Sep. 30, 2019, the entire content of which is incorporated herein by reference.

FIELD

The present disclosure relates to a field of image processing technologies, more particularly, to a field of unmanned retail product recognition, and especially, to a method and a device for recognizing a product.

BACKGROUND

At present, in a smart retail store, gravity sensors and cameras may be installed on shelves to recognize the product taken by customers from the shelves. However, it is difficult to recognize a delivery of the product between the customers, resulting in a difference of the productions under the name of the customer from the reality.

SUMMARY

The present disclosure provides a method for recognizing a product. The method includes: acquiring a video taken by each camera in a store; performing a recognition on each video to obtain a video segment that a product delivery is recognized and to obtain participated users including a delivery initiation user and a delivery reception user; inputting the video segment into a preset delivery recognition model to obtain a recognition result including a product delivered and a delivery probability; and updating product information of products carried by the participated users based on the recognition result.

The present disclosure provides an electronic device. The electronic device includes: at least one processor; and a memory connected in communication with the at least one processor. The memory is configured to store instructions executable by the at least one processor. The instruction is executed by the at least one processor to enable the at least one processor to implement a method for recognizing a product according to above embodiments of the present disclosure.

The present disclosure provides a method for recognizing a product. The method includes: acquiring a video taken by each camera in a store; performing a recognition on each video to obtain a video segment that a product delivery is recognized, to obtain participated users including a delivery initiation user and a delivery reception user and to obtain a product delivered; and updating product information of products carried by the participated users based on the participated users and the product delivered.

Other effects of the foregoing implementations will be described below with reference to embodiments.

BRIEF DESCRIPTION OF THE DRAWINGS

The present disclosure will be well understood with reference to the accompanying drawings, and the drawings do not constitute a limitation on this application, in which.

DETAILED DESCRIPTION

Exemplary embodiments of the present disclosure are described below with reference to the accompanying drawings, which include various details of the embodiments of the present disclosure to facilitate understanding, and should be considered as merely exemplary. Therefore, those skilled in the art should recognize that various changes and modifications may be made to the embodiments described herein without departing from the scope and spirit of the present disclosure. Also, for clarity and conciseness, descriptions of well-known functions and structures are omitted in the following description.

The present disclosure provides a method and a device for recognizing a product, an electronic device and a non-transitory computer readable storage medium. By recognizing a product delivery between customers, it may allow that products under the customer's name is consistent with the reality, thereby improving an efficiency of product recognition.

With the method and the device for recognizing a product, the electronic device, and the non-transitory computer readable storage medium according to embodiments of the present disclosure, by acquiring the video taken by each camera in the store; performing the recognition on each video to obtain the video segment that the product delivery is recognized and to obtain participated users including the delivery initiation user and the delivery reception user; inputting the video segment into the preset delivery recognition model to obtain the recognition result including the product delivered and the delivery probability; and updating the product information carried by the participated users based on the recognition result, recognition on the product delivery between users is achieved, thereby allowing that the product under the user's name is consistent with the reality, and improving an efficiency of product recognition.

A method and a device for recognizing a product according to embodiments of the present disclosure will be described below with reference to the drawings.

Figure 1:
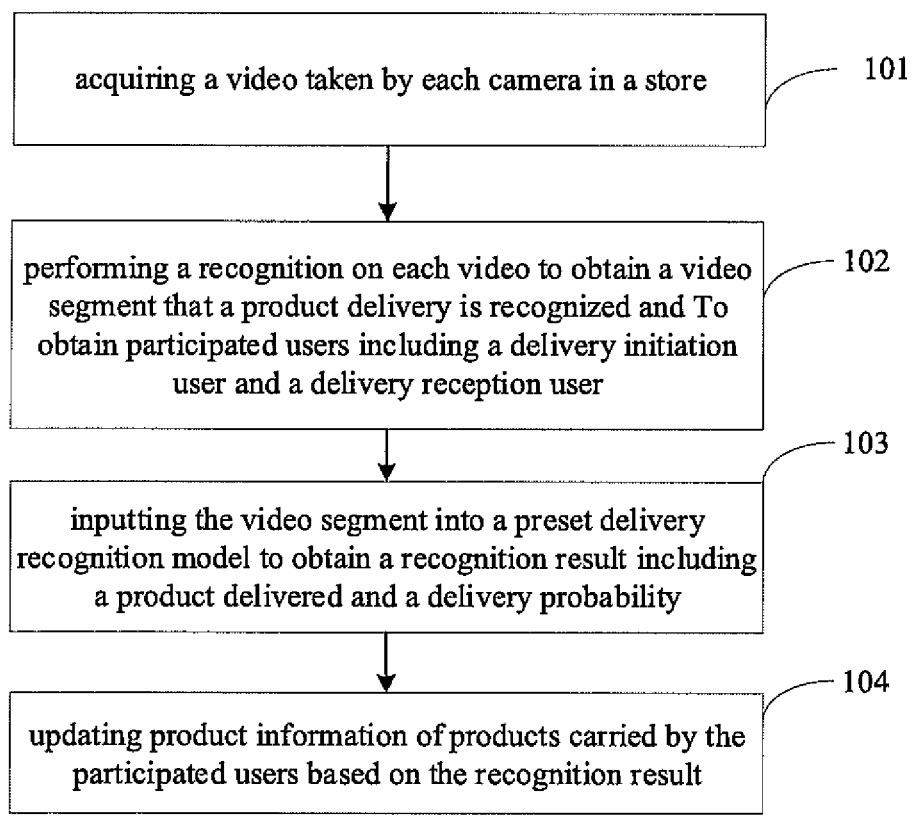
FIG. 1 is a schematic diagram according to embodiments of the present disclosure.

FIG. 1 is a schematic diagram according to embodiments of the present disclosure. It should be noted that, an execution subject of the method for recognizing a product according to embodiments is a device for recognizing a product. The device may be implemented by software and/or hardware. The device may be integrated in a terminal device or server, which is not limited in embodiments of the present disclosure.

As illustrated in FIG. 1, the method for recognizing a product may include the following.

At block 101, a video taken by each camera in a store is acquired.

In the present disclosure, the camera may be located on the top of the store and faced inside the store. More than one camera may be provided such that a field of view of each camera covers a portion of the store, and all cameras cover or monitor the whole store.

In the present disclosure, the camera may be connected to the device for recognizing a product to upload the video taken by each camera to the device for recognizing a product in real time. In addition, the camera may also upload its own identification to the device for recognizing a product, such that the device may know which camera the video is uploaded from.

At block 102, a recognition is performed on each video to obtain a video segment that a product delivery is recognized and to obtain participated users. The participated users include a delivery initiation user and a delivery reception user.

In the present disclosure, implementing the block 102 by the device for recognizing a product may include, performing the recognition on each image of each video to obtain at least one first image that the product delivery is recognized; sequencing the at least one first image based on time points indicating by the sequencing result to aggregate adjacent first images that a time point difference between the adjacent first images is less than a preset difference threshold to obtain at least one video segment; and determining the participated users corresponding to the video segment.

The product delivery is an action lasting for a certain period of time. Therefore, a single product delivery may be presented in several images. In order to ensure an accuracy of recognizing of the product subsequently, multiple images presenting the product delivery may be acquired for subsequent recognition. In the present disclosure, the same product delivery is generally continuous, and different product deliveries are generally discontinuous. Therefore, at least one first image may be sequenced based on time points of the at least one first image to obtain a time point difference between adjacent first images based on the sequencing result. The adjacent first images corresponding to the time point difference less than a preset difference threshold are aggregated to obtain the video segment corresponding to each product delivery. The difference threshold may be determined based on a time point difference between adjacent images of the video.

In the present disclosure, determining the anticipated users corresponding to the video segment by the device for recognizing a product may include: acquiring depth information corresponding to each image of the video segment; determining point cloud information of each image of the video segment based on each image of the video segment and the depth information; and determining the participated users corresponding to the video segment based on the point cloud information of each image of the video segment and point cloud information of each user in the store.

In the present disclosure, after the participated users corresponding to the video segment are determined, a position and a body posture of each participated user may be determined based on the point cloud information of the participated users of the video segment to distinguish between the delivery initiation user and the delivery reception user based on the position and the body posture of each participated user.

In the present disclosure, the device for recognizing a product may be configured to generate global point cloud information of the store in real time based on the video captured by each camera and the depth information of each image of the video. In addition, the device is configured to cluster the global point cloud information to generate the point cloud information of each user, and track the point cloud information of each user in real time to determine the product information of products carried by each user. During tracking the point cloud information of each user, in a case that the user fetches a product from a shelf, product information of product fetched may be added to the product information of the products carried by the user. In a case that the user receives a product delivered by another user, product information of the product received may be added to the product information of products carried by the user.

At block 103, the video segment is input into a preset delivery recognition model to obtain a recognition result. The recognition result includes: a product delivered and a delivery probability.

In the present disclosure, processing the video segment by the delivery recognition model includes: acquiring a pre-delivery image, an on-delivery image and a post-delivery image from the video segment; performing the recognition on the pre-delivery image to determine the product held by the delivery initiation user before the delivery and a first recognition probability of the product held by the delivery initiation user before the delivery; performing the recognition om the on-delivery image to determine the product held simultaneously by the delivery initiation user and the delivery reception user during the delivery and a second recognition probability of the product held simultaneously by the delivery initiation user and the delivery reception user during the delivery; performing the recognition on the post-delivery image to determine the product held by the delivery reception user after the delivery and a third recognition probability of the product held by the delivery reception user after the delivery; and determining the product delivered and the delivery probability based on the product held by the delivery initiation user before the delivery and the first recognition probability, the product held simultaneously by the delivery initiation user and the delivery reception user during the delivery and the second recognition probability, and the product held by the delivery reception user after the delivery and the third recognition probability.

In detail, for each product, the first recognition probability of the product before the delivery, the second recognition probability of the product during the delivery, and the third recognition probability of the product after the delivery may be multiplied to obtain the delivery probability corresponding to the product.

At block 104, the product information of products carried by the participated users is updated based on the recognition result.

In the present disclosure, implementing the block 104 by the device for recognizing a product may include: acquiring a first product corresponding to a maximum delivery probability based on the recognition result; deleting first product information of the first product from the product information of products carried by the delivery initiation user; and adding the first product information of the first product to the product information of products carried by the delivery reception user.

With the method for recognizing a product according to embodiments of the present disclosure, by acquire the video taken by each camera in the store; performing the recognition on each video to obtain the video segment that the product delivery is recognized and to obtain participated users including the delivery initiation user and the delivery reception user; inputting the video segment into the preset delivery recognition model to obtain the recognition result including the product delivered and the delivery probability; and updating the product information of products carried by the participated users based on the recognition result, recognition on the product delivery between users is achieved, thereby allowing that the product under the user's name is consistent with the reality, and improving an efficiency of product recognition.

In order to implement the foregoing embodiment, embodiments of the present disclosure further provide a device for recognizing a product.

Figure 2:
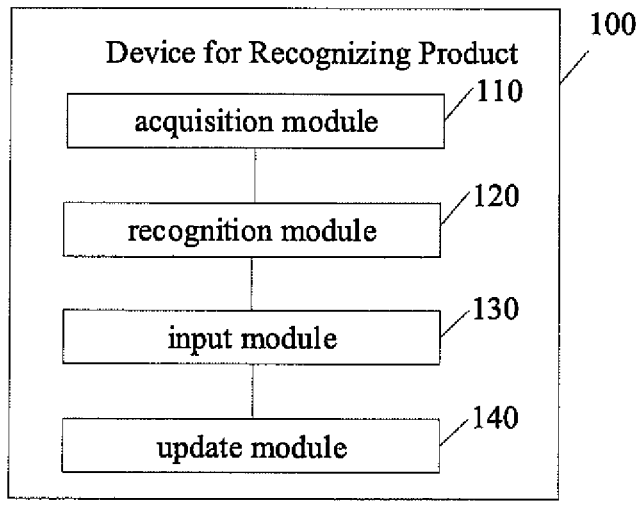
FIG. 2 is a schematic diagram according to embodiments of the present application.

FIG. 2 is a schematic diagram according to embodiments of the present disclosure. As illustrated in FIG. 2, the device 100 for recognizing a product may include: an acquisition module 110, a recognition module 120, an input module 130 and an update module 140.

The acquisition module 110 is configured to acquire a video taken by each camera in a store.

The recognition module 120 is configured to perform a recognition on each video to obtain a video segment that a product delivery is recognized and to obtain participated users. The participated users include a delivery initiation user and a delivery reception user.

The input module 130 is configured to input the video segment into a preset delivery recognition model to obtain a recognition result. The recognition result includes: a product delivered and a delivery probability.

The update module 140 is configured to update product information of products carried by the participated users based on the recognition result.

In an embodiment of the present disclosure, the recognition module 120 is configured to perform the recognition on each image of each video to obtain at least one first image that the product delivery is recognized; to sequence the at least one first image based on time points to aggregate, based on a sequencing result, adjacent first images that a time point difference between the adjacent first images is less than a preset difference threshold to obtain at least one video segment; and to determine the participated users corresponding to the video segment.

In an embodiment of the present disclosure, the recognition module 120 is configured to acquire depth information corresponding to each image of the video segment; determine point cloud information of each image of the video segment based on each image of the video segment and the depth information; and determine the participated users corresponding to the video segment based on the point cloud information of each image of the video segment and point cloud information of each user in the store.

In an embodiment of the present disclosure, processing the video segment by the delivery recognition model includes: acquiring a pre-delivery image, an on-delivery image and a post-delivery image from the video segment; performing the recognition on the pre-delivery image to determine the product held by the delivery initiation user before the delivery and a first recognition probability of the product; performing the recognition on the on-delivery image to determine the product held simultaneously by the delivery initiation user and the delivery reception user during the delivery and a second recognition probability of the product; performing the recognition on the post-delivery image to determine the product held by the delivery reception user after the delivery and a third recognition probability of the product; and determining the product delivered and the delivery probability based on the product held by the delivery initiation user before the delivery and the first recognition probability, the product held simultaneously by the delivery initiation user and the delivery reception user during the delivery and the second recognition probability, and the product held by the delivery reception user after the delivery and the third recognition probability.

In an embodiment of the present disclosure, the update module 140 is configured to acquire a first product corresponding to a maximum delivery probability based on the recognition result; delete first product information of the first product from the product information of products carried by the delivery initiation user; and add the first product information of the first product to the product information of products carried by the delivery reception user.

It should be noted that, the foregoing explanation of the method for recognizing a product is also applicable to the device for recognizing a product according to embodiments, and details are not described herein again.

With the device for recognizing a product according to embodiments of the present disclosure, by acquiring the video taken by each camera in the store; performing the recognition on each video to obtain the video segment that the product delivery is recognized and to obtain participated users including the delivery initiation user and the delivery reception user; inputting the video segment into the preset delivery recognition model to obtain the recognition result including the product delivered and the delivery probability; and updating the product information of products carried by the participated users based on the recognition result, recognition of the product delivery between users is achieved, thereby allowing that the product under the user's name is consistent with the reality, and improving an efficiency of product recognition.

Figure 3:
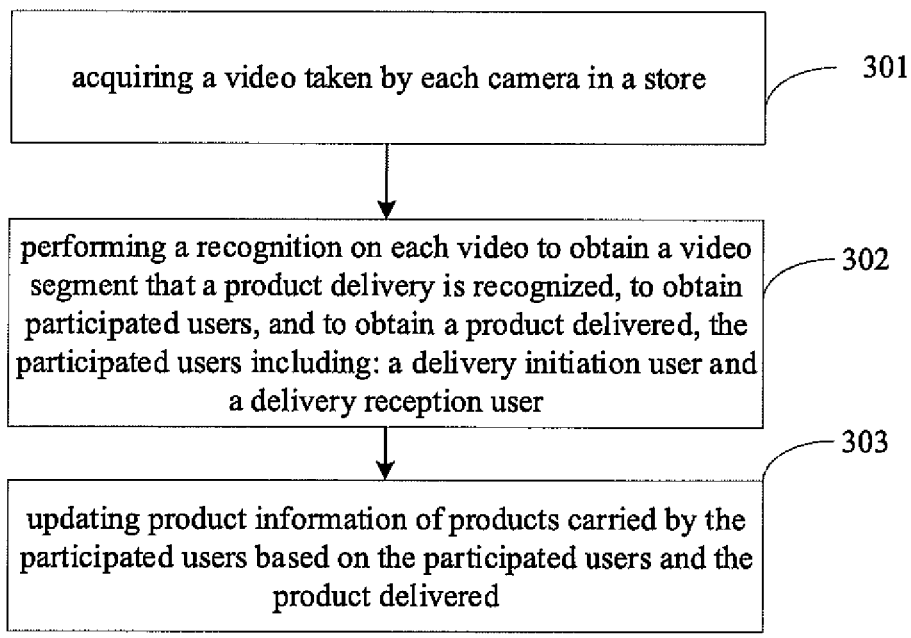
FIG. 3 is a schematic diagram according to embodiments of the present application.

FIG. 3 is a schematic diagram according to embodiments of the present disclosure. It should be noted that, the execution subject of the method for recognizing a product according to embodiments may be a device for recognizing a product. The device may be implemented by software and/or hardware. The device may be integrated in a terminal device or server, which is not limited in embodiments of the present disclosure.

As illustrated in FIG. 3, the method for recognizing a product may include the following.

At block 301, a video taken by each camera in a store is acquired.

At block 302, a recognition is performed on each video to obtain a video segment that a product delivery is recognized, to obtain participated users and to obtain a product delivered. The participated users include a delivery initiation user and a delivery reception user.

In an example, the device for recognizing a product may be configured to perform the recognition on each video to obtain the video segment that the product delivery is recognized and to obtain the participated users. The participated users include the delivery initiation user and the delivery reception user. In addition, the device is configured to input the video segment into a preset delivery recognition model to obtain a recognition result. The recognition result includes the product delivered and a delivery probability. Furthermore, the device is configured to determine the product delivered based on the recognition result.

In another example, the device for recognizing a product may be configured to select an image that the product delivery may be recognized from the video and perform the recognition on the image to determine the product delivered and the participated users.

At block 303, product information of products carried by the participated users is updated based on the participated users and the product delivered.

It should be noted that the foregoing explanation of the method for recognizing a product is also applicable to this method for recognizing a product according to embodiments, and details are not described herein again.

With the method for recognizing a product according to embodiments of the present disclosure, by acquire the video taken by each camera in the store; performing the recognition on each video to obtain the video segment that the product delivery is recognized, to obtain the participated users including the delivery initiation user and the delivery reception user, and to obtain the product delivered; and updating the product information of products carried by the participated users based on the participated users and the product delivered, recognition of the product delivery between users is achieved, thereby allowing that the product under the user's name is consistent with the reality, and improving an efficiency of product recognition.

According to embodiments of the present disclosure, the present disclosure further provides an electronic device and a readable storage medium.

Figure 4:
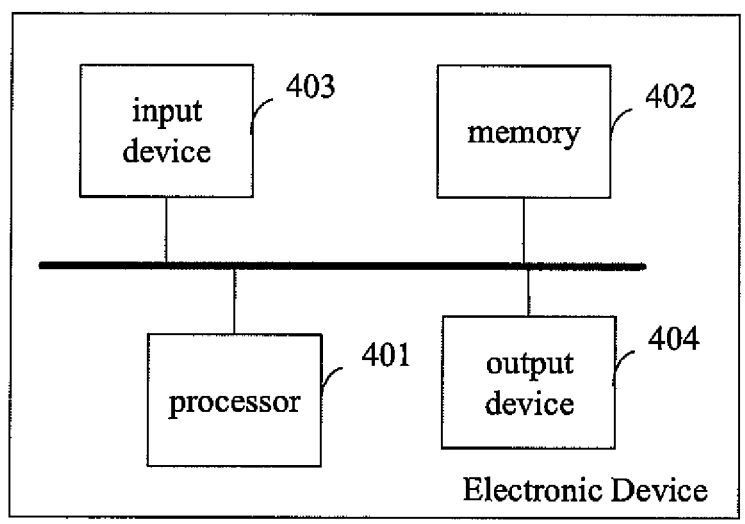
FIG. 4 is a block diagram illustrating an electronic device for implementing a method for recognizing a product according to embodiments of the present disclosure.

FIG. 4 is a block diagram illustrating an electronic device for implementing a method for recognizing a product according to embodiments of the present disclosure. The electronic device is intended to represent various forms of digital computers, such as a laptop computer, a desktop computer, a workbench, a personal digital assistant, a server, a blade server, a mainframe computer and other suitable computers. The electronic device may also represent various forms of mobile devices, such as a personal digital processor, a cellular phone, a smart phone, a wearable device and other similar computing devices. Components shown herein, their connections and relationships as well as their functions are merely examples, and are not intended to limit the implementation of the present disclosure described and/or required herein.

As illustrated in FIG. 4, the electronic device includes: one or more processors 401, a memory 402, and interfaces for connecting various components. The interfaces include a high-speed interface and a low-speed interface. The components are interconnected by different buses and may be mounted on a common motherboard or otherwise installed as required. The processor may process instructions executed within the electronic device, including instructions stored in or on the memory to display graphical information of the GUI on an external input/output device (such as a display device coupled to the interface). In other embodiments, when necessary, multiple processors and/or multiple buses may be used with multiple memories. Similarly, multiple electronic devices may be connected, each providing some of the necessary operations (for example, as a server array, a group of blade servers, or a multiprocessor system). One processor 401 is taken as an example in FIG. 4.

The memory 402 is a non-transitory computer-readable storage medium according to embodiments of the present disclosure. The memory is configured to store instructions executable by at least one processor, so that the at least one processor executes the method for recognizing a product according to embodiments of the present disclosure. The non-transitory computer-readable storage medium according to the present disclosure is configured to store computer instructions, which are configured to cause the computer execute the method for recognizing a product according to embodiments of the present disclosure.

As a non-transitory computer-readable storage medium, the memory 402 may be configured to store non-transitory software programs, non-transitory computer executable programs and modules, such as program instructions/modules (for example, the acquisition module 110, the recognition module 120, he input module 130, and the update module 140 shown in FIG. 2) corresponding to the methods for recognizing a product according to the embodiment of the present disclosure. The processor 401 is configured to execute various functional applications and perform data processing of the server by running non-transitory software programs, instructions and modules stored in the memory 402. That is, the method for recognizing a product according to foregoing method embodiments is implemented.

The memory 402 may include a storage program area and a storage data area, where the storage program area may store an operating system and applications required for at least one function; and the storage data area may store data created based on the use of the electronic device for recognizing a product, and the like. In addition, the memory 402 may include a high-speed random-access memory, and may further include a non-transitory memory, such as at least one magnetic disk memory, a flash memory device, or other non-transitory solid-state memories. In some embodiments, the memory 402 may optionally include memories remotely disposed with respect to the processor 401, and these remote memories may be connected to the electronic device for recognizing a product through a network. Examples of the network include, but are not limited to, the Internet, an intranet, a local area network, a mobile communication network, and combinations thereof.

The electronic device configured to implement the method for recognizing a product may further include an input device 403 and an output device 404. The processor 401, the memory 402, the input device 403 and the output device 404 may be connected through a bus or in other manners. FIG. 4 is illustrated by establishing the connection through a bus.

The input device 403 may receive input numeric or character information, and generate key signal inputs related to user settings and function control of the electronic device for recognizing a product, such as a touch screen, a keypad, a mouse, a trackpad, a touchpad, a pointing stick, one or more mouse buttons, trackballs, joysticks and other input devices. The output device 404 may include a display device, an auxiliary lighting device (for example, an LED), a haptic feedback device (for example, a vibration motor), and so on. The display device may include, but is not limited to, a liquid crystal display (LCD), a light emitting diode (LED) display and a plasma display. In some embodiments, the display device may be a touch screen.

Various implementations of systems and technologies described herein may be implemented in digital electronic circuit systems, integrated circuit systems, application-specific ASICs (application-specific integrated circuits), computer hardware, firmware, software, and/or combinations thereof. These various implementations may include: being implemented in one or more computer programs that are executable and/or interpreted on a programmable system including at least one programmable processor. The programmable processor may be a dedicated or general-purpose programmable processor that may receive data and instructions from a storage system, at least one input device and at least one output device, and transmit the data and instructions to the storage system, the at least one input device and the at least one output device.

These computing programs (also known as programs, software, software applications, or codes) include machine instructions of a programmable processor, and may implement these calculation procedures by utilizing high-level procedures and/or object-oriented programming languages, and/or assembly/machine languages. As used herein, terms "machine-readable medium" and "computer-readable medium" refer to any computer program product, device and/or apparatus configured to provide machine instructions and/or data to a programmable processor (for example, a magnetic disk, an optical disk, a memory and a programmable logic device (PLD)), and includes machine-readable media that receive machine instructions as machine-readable signals. The term "machine-readable signals" refers to any signal used to provide machine instructions and/or data to a programmable processor.

In order to provide interactions with the user, the systems and technologies described herein may be implemented on a computer having: a display device (for example, a cathode ray tube (CRT) or a liquid crystal display (LCD) monitor) for displaying information to the user; and a keyboard and a pointing device (such as a mouse or trackball) through which the user may provide input to the computer. Other kinds of devices may also be used to provide interactions with the user; for example, the feedback provided to the user may be any form of sensory feedback (e.g., visual feedback, auditory feedback or haptic feedback); and input from the user may be received in any form (including acoustic input, voice input or tactile input).

The systems and technologies described herein may be implemented in a computing system that includes back-end components (for example, as a data server), a computing system that includes middleware components (for example, an application server), or a computing system that includes front-end components (for example, a user computer with a graphical user interface or a web browser, through which the user may interact with the implementation of the systems and technologies described herein), or a computing system including any combination of the back-end components, the middleware components or the front-end components. The components of the system may be interconnected by digital data communication (e.g., a communication network) in any form or medium. Examples of the communication network include: a local area network (LAN), a wide area network (WAN), and the Internet.

Computer systems may include a client and a server. The client and server are generally remote from each other and typically interact through the communication network. A client-server relationship is generated by computer programs running on respective computers and having a client-server relationship with each other.

It should be understood that various forms of processes shown above may be reordered, added or deleted. For example, the blocks described in the present disclosure may be executed in parallel, sequentially, or in different orders. As long as the desired results of the technical solution disclosed in the present disclosure may be achieved, there is no limitation herein.

The foregoing specific implementations do not constitute a limit on the protection scope of the present disclosure. It should be understood by those skilled in the art that various modifications, combinations, sub-combinations and substitutions may be made according to design requirements and other factors. Any modification, equivalent replacement and improvement made within the spirit and principle of the present disclosure shall be included in the protection scope of the present disclosure.

What is claimed is:

1. A method for recognizing a product, comprising:
acquiring a video taken by each of at least one camera;
performing a recognition on each video to obtain a video segment that a product delivery is recognized and to obtain participated users, the participated users comprising: a delivery initiation user and a delivery reception user;
inputting the video segment into a preset delivery recognition model to obtain a recognition result, the recognition result comprising: a product delivered and a delivery probability; and
updating product information of products carried by the participated users based on the recognition result;
wherein performing the recognition on each video to obtain the video segment that the product delivery is recognized and to obtain the participated users comprises:
performing the recognition on each image of each video to obtain at least one first image that the product delivery is recognized; sequencing the at least one first image based on a time point to aggregate adjacent first images that a time point difference between the adjacent first images is less than a preset difference threshold to obtain at least one video segment; and determining the participated users corresponding to the video segment; and
wherein the video segment is processed by the delivery recognition model by:
acquiring a pre-delivery image, an on-delivery image and a post-delivery image from the video segment; performing the recognition on the pre-delivery image to determine a product held by the delivery initiation user before the product delivery and a first recognition probability of the product; performing the recognition on the on-delivery image to determine a product held simultaneously by the delivery initiation user and the delivery reception user during the product delivery and a second recognition probability of the product; performing the recognition on the post-delivery image to determine a product held by the delivery reception user after the product delivery and a third recognition probability of the product; and determining the product delivered and the delivery probability based on the product held by the delivery initiation user before the product delivery and the first recognition probability, the product held simultaneously by the delivery initiation user and the delivery reception user during the product delivery and the second recognition probability, and the product held by the delivery reception user after the product delivery and the third recognition probability.

2. The method of claim 1, wherein determining the participated users corresponding to the video segment comprises:
acquiring depth information corresponding to each image of the video segment;
determining point cloud information of each image of the video segment based on each image of the video segment and the depth information corresponding to each image; and
determining the participated users corresponding to the video segment based on the point cloud information of each image of the video segment and point cloud information of each user.

3. The method of claim 2, further comprising:
determining a position and a body gesture of each participated user based on the point cloud information of each participated user; and
determining the delivery initiation user and the delivery reception user, based on the position and the body gesture of each participated user.

4. The method of claim 1, wherein determining the delivery probability based on the first recognition probability, the second recognition probability and the third recognition probability comprises:
   determining a multiply of the first recognition probability, the second recognition probability and the third recognition probability as the delivery probability.

5. The method of claim 1, wherein updating the product information of products carried by the participated users based on the recognition result comprises:
   acquiring a first product corresponding to a maximum delivery probability based on the recognition result;
   deleting first product information of the first product from the product information of products carried by the delivery initiation user; and
   adding the first product information of the first product to the product information of products carried by the delivery reception user.

6. An electronic device, comprising:
   at least one processor; and
   a memory connected in communication with the at least one processor;
   wherein, the memory is configured to store an instruction executable by the at least one processor, and the instruction is executed by the at least one processor to enable the at least one processor to:
   acquire a video taken by each of at least one camera;
   perform a recognition on each video to obtain a video segment that a product delivery is recognized and to obtain participated users, the participated users comprising: a delivery initiation user and a delivery reception user;
   input the video segment into a preset delivery recognition model to obtain a recognition result, the recognition result comprising: a product delivered and a delivery probability; and
   update product information of products carried by the participated users based on the recognition result;
   wherein the one or more processors are enabled to perform the recognition on each video to obtain the video segment that the product delivery is recognized and to obtain the participated users by:
   performing the recognition on each image of each video to obtain at least one first image that the product delivery is recognized; sequencing the at least one first image based on a time point to aggregate adjacent first images that a time point difference between the adjacent first images is less than a preset difference threshold to obtain at least one video segment; and determining the participated users corresponding to the video segment; and
   wherein the video segment is processed by the delivery recognition model by:
   acquiring a pre-delivery image, an on-delivery image and a post-delivery image from the video segment; performing the recognition on the pre-delivery image to determine a product held by the delivery initiation user before the product delivery and a first recognition probability of the product; performing the recognition on the on-delivery image to determine a product held simultaneously by the delivery initiation user and the delivery reception user during the product delivery and a second recognition probability of the product; performing the recognition on the post-delivery image to determine a product held by the delivery reception user after the product delivery and a third recognition probability of the product; and determining the product delivered and the delivery probability based on the product held by the delivery initiation user before the product delivery and the first recognition probability, the product held simultaneously by the delivery initiation user and the delivery reception user during the product delivery and the second recognition probability, and the product held by the delivery reception user after the product delivery and the third recognition probability.

7. The electronic device of claim 6, wherein the one or more processors are enabled to determine the participated users corresponding to the video segment by:
   acquiring depth information corresponding to each image of the video segment;
   determining point cloud information of each image of the video segment based on each image of the video segment and the depth information corresponding to each image; and
   determining the participated users corresponding to the video segment based on the point cloud information of each image of the video segment and point cloud information of each user.

8. The electronic device of claim 7, wherein the one or more processors are enabled to:
   determine a position and a body gesture of each participated user based on the point cloud information of each participated user; and
   determine the delivery initiation user and the delivery reception user, based on the position and the body gesture of each participated user.

9. The electronic device of claim 6, wherein the one or more processors are enabled to determine the delivery probability based on the first recognition probability, the second recognition probability and the third recognition probability by:
   determining a multiply of the first recognition probability, the second recognition probability and the third recognition probability as the delivery probability.

10. The electronic device of claim 6, wherein the one or more processors are enabled to update the product information of products carried by the participated users based on the recognition result by:
    acquiring a first product corresponding to a maximum delivery probability based on the recognition result;
    deleting first product information of the first product from the product information of products carried by the delivery initiation user; and
    adding the first product information of the first product to the product information of products carried by the delivery reception user.

11. A method for recognizing a product, comprising:
    acquiring a video taken by each of at least one camera;
    performing a recognition on each video to obtain a video segment that a product delivery is recognized, to obtain participated users, and to obtain a product delivered, the participated users comprising a delivery initiation user and a delivery reception user; and
    updating product information of products carried by the participated users based on the participated users and the product delivered;
    wherein performing the recognition on each video to obtain the video segment that a product delivery is recognized, to obtain the participated users, and to obtain the product delivered comprises:
    performing the recognition on each video to obtain the video segment and the participated users; inputting the video segment into a preset delivery recognition model to obtain a recognition result, the recognition result comprising a product delivered and a delivery probability; and determining the product delivered based on the recognition result; and wherein processing the video segment by the delivery recognition model comprises:

acquiring a pre-delivery image, an on-delivery image and a post-delivery image from the video segment; performing the recognition on the pre-delivery image to determine a product held by the delivery initiation user before the product delivery and a first recognition probability of the product; performing the recognition on the on-delivery image to determine a product held simultaneously by the delivery initiation user and the delivery reception user during the product delivery and a second recognition probability of the product; performing the recognition on the post-delivery image to determine a product held by the delivery reception user after the product delivery and a third recognition probability of the product; and determining the product delivered and the delivery probability based on the product held by the delivery initiation user before the product delivery and the first recognition probability, the product held simultaneously by the delivery initiation user and the delivery reception user during the product delivery and the second recognition probability, and the product held by the delivery reception user after the product delivery and the third recognition probability.

12. The method of claim 11, wherein performing the recognition on each video to obtain the video segment and the participated users comprises:

performing the recognition on each image of each video to obtain at least one first image that the product delivery is recognized;

sequencing the at least one first image based on a time point to aggregate adjacent first images that a time point difference between the adjacent first images is less than a preset difference threshold to obtain at least one video segment; and determining the participated users corresponding to the video segment.

13. The method of claim 12, wherein determining the participated users corresponding to the video segment comprises:

acquiring depth information corresponding to each image of the video segment;

determining point cloud information of each image of the video segment based on each image of the video segment and the depth information corresponding to each image; and determining the participated users corresponding to the video segment based on the point cloud information of each image of the video segment and point cloud information of each user.

14. The method of claim 11, wherein the product information of products carried by the participated users is updated by:

acquiring a first product corresponding to a maximum delivery probability;

deleting first product information of the first product from the product information of products carried by the delivery initiation user; and adding the first product information of the first product to the product information of products carried by the delivery reception user.

* * * * *